United States Patent [19]
Onishi

[11] Patent Number: 6,152,535
[45] Date of Patent: Nov. 28, 2000

[54] AUTOMOBILE SEAT WITH DEVICE FOR HOLDING A HUMAN BODY

[76] Inventor: Teruhisa Onishi, 503-12, Soja,Tsuyama-shi, Okayama, Japan

[21] Appl. No.: 09/431,598

[22] Filed: Nov. 1, 1999

Related U.S. Application Data

[62] Division of application No. 09/201,186, Nov. 30, 1998.
[51] Int. Cl.[7] .................................................. A47C 31/00
[52] U.S. Cl. .......................... 297/464; 296/68.1; 280/748
[58] Field of Search .................................. 5/89.1, 81.1 R; 297/464, 467; 296/68.1; 280/748

[56] References Cited

U.S. PATENT DOCUMENTS

| | | | |
|---|---|---|---|
| 4,485,504 | 12/1984 | Lehmann | 5/425 |
| 4,805,248 | 2/1989 | Lunau | 5/89.1 |
| 4,906,047 | 3/1990 | Mikami | 297/464 |
| 4,945,583 | 8/1990 | Schnitzler | 5/81.1 R |
| 5,325,550 | 7/1994 | Dearstyne et al. | 5/89.1 |
| 5,502,851 | 4/1996 | Costello | 5/89.1 |
| 5,729,843 | 3/1998 | Manthey | 5/89.1 |

FOREIGN PATENT DOCUMENTS 2693902  1/1994  France ....................................... 5/89.1

*Primary Examiner*—Alexander Grosz
*Attorney, Agent, or Firm*—Koda & Androlia

[57] ABSTRACT

A body-holding device in which a combination comprised of: a main body base suspension fitting, a pair of side-holding arms which hold both sides of a person, a pair of shoulder-holding arms which hold both shoulders of the person, a crotch supporter which supports the person's crotch, a transmission mechanism which links the movement of the suspension fitting, respective holding arms and the crotch supporter, and locking elements which constrain and release the respective holding arms and crotch supporter, is installed on a main body base of the device which is fastened to an automobile seat. The device eliminates heavy labor performed by a person assisting disabled persons such as handicapped persons, persons suffering from illness and elderly persons, etc.; and in addition, the device eliminates heavy labor by assisting the body functions of able-bodied persons, and it also has a body-holding function as a shock-absorbing device or a life-saving device.

2 Claims, 7 Drawing Sheets

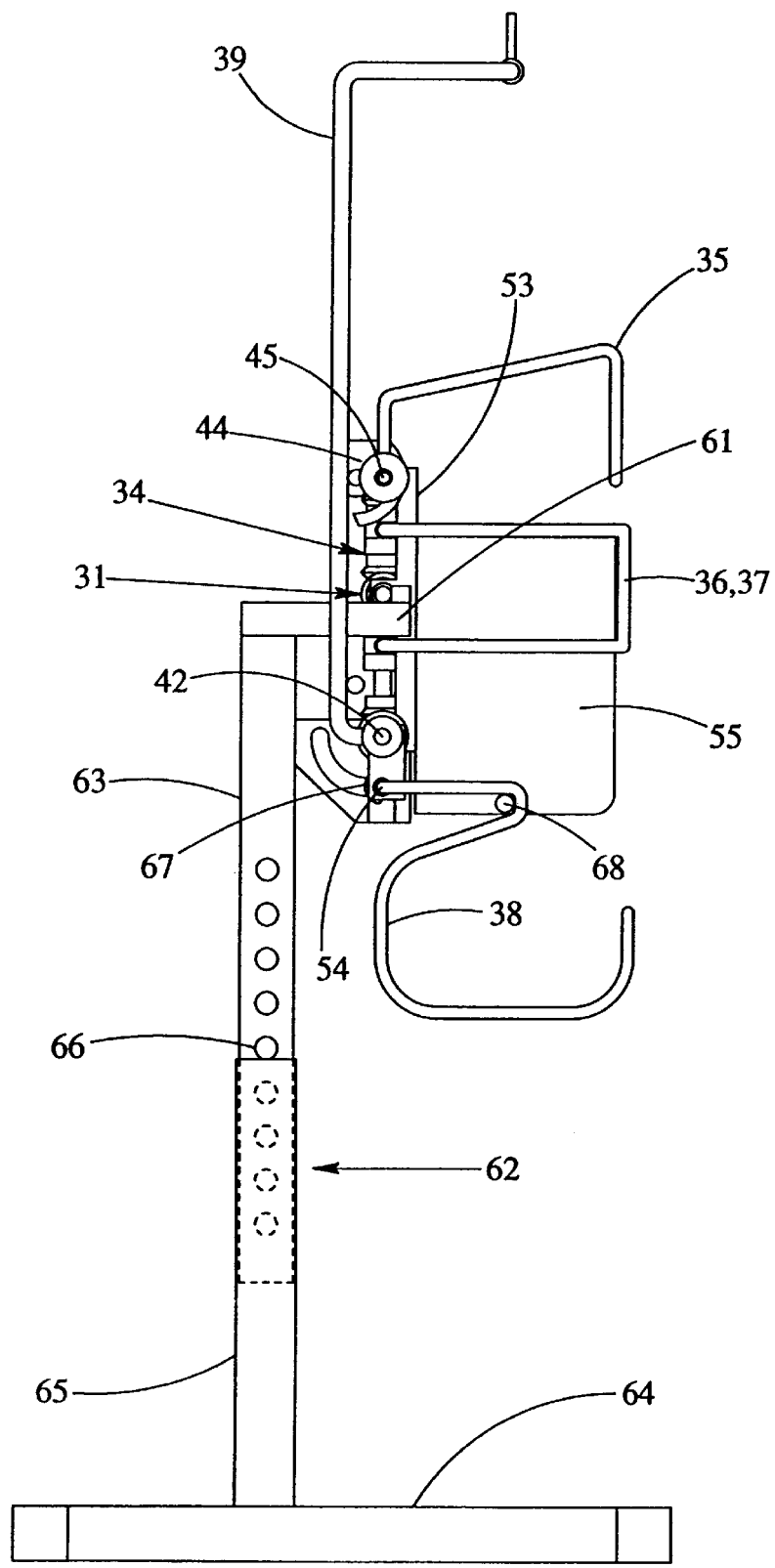

AUTOMOBILE SEAT WITH DEVICE FOR HOLDING A HUMAN BODY

This is a Divisional Application of application Ser. No. 09/201,186 filed Nov. 30, 1998.

BACKGROUND OF THE INVENTION

1. Field of the Invention

The present invention relates to a device for holding a human body; and more particularly, the object of the present invention is to provide at low cost a bodyholding device which is easy to operate and easy to attach and detach as an assisting device, especially for people who have difficulty raising their bodies under their own power or have difficulty walking.

2. Prior Art

In the past, assistance for disabled persons such as handicapped persons, persons suffering from illness or elderly persons has depended almost exclusively on the human power of nurses or assistants. In regard to mechanical devices, there have been examples of the utilizing of reclining beds which are used to raise the upper half of a patient's body from a supine position. However, currently, movement from the bed still relies on human power.

Accordingly, movements involving rising from a bed and getting into a wheelchair require heavy labor on the part of the assistant, thus leading to a deterioration in the work environment of the assistant. This tendency is becoming stronger as our society becomes more aged, causing a serious social problem.

In addition, other problems with disabled persons include the following: when disabled persons board high-speed vehicles such as automobiles, etc., they cannot be safely fastened in place by means of conventional seat belts; in addition, there are no devices to assist in maintaining the posture of such persons when they work in a standing position or work in a seated position.

SUMMARY OF THE INVENTION

The present invention was devised in light of the above facts.

More specifically, the present invention provides a device for holding a human body in which a combination of: a main body base suspension fitting, a pair of side-holding arms which hold both sides of a person, a pair of shoulder-holding arms which hold the shoulders of the person, a crotch supporter which supports the person's crotch, a transmission mechanism which links the movements of the suspension fitting, respective holding arms and the crotch supporter, and locking elements which constrain and release the respective holding arms and crotch supporter, is installed on a main body base of the device. Here, the term "main body base" refers to a component which acts as a reference for the movements of the respective movable elements and transmission mechanism, and which acts as a matrix for the connection of various elements. In concrete terms, a main body plate and main shaft which will be described later form this main body base. The shoulder-holding arms may be separately installed in positions so as to correspond to both shoulders, or a component with a roughly U-shaped external form that surrounds the neck may be used. Furthermore, the holding arms and crotch supporter can be frame-form components formed by bending a pipe or planar components consisting of plate materials.

In a concrete structure, the body-holding device includes a main body plate which contacts the person's chest; and the main body plate has a vertical length that roughly corresponds to the seated height of the person's shoulders and a horizontal length that roughly corresponds to the width of the person's chest; and a combination, which comprises a suspension fitting pivoting shaft which extends in the lateral direction of the main body plate, a suspension fitting which extends in the longitudinal direction of the main body plate, a pair of side-holding arms with pivoting shafts located to the left and right of the main body plate, shoulder-holding arms with pivoting shafts located in front of the main body plate, a crotch supporter with a pivoting shaft located in the center to the rear of the main body plate, a transmission mechanism which links the movements of the suspension fitting, respective holding arms and crotch supporter, and locking elements which constrain and release the respective holding arms and crotch supporter, is provided on the main body plate.

Furthermore, it is also possible to construct the body-holding device so that it includes a main shaft that has a longitudinal length shorter than the seated height of a person's shoulders and has a pair of forward and reverse pivoting tubes fitted over it via a differential gear mechanism; and a combination, which comprises a suspension fitting that extends in the same direction as the main shaft, a pair of side-holding arms that use the main shaft as a pivoting shaft, shoulder-holding arms that have pivoting shafts perpendicular to the main shaft, a crotch supporter that has a pivoting shaft perpendicular to the main shaft, a transmission mechanism which links the movements of the suspension fitting, respective holding arms and crotch supporter, and locking elements which constrain and release the respective holding arms and crotch supporter, is provided on this main shaft.

The transmission mechanism of the body-holding devices opens all of the holding arms and the crotch supporter when the suspension fitting is facing roughly in a direction perpendicular to the main body base, and closes all of the holding arms and the crotch supporter when the suspension fitting pivots and faces roughly in a direction parallel to the main body base. This transmission mechanism links the movements of the suspension fitting, respective holding arms and crotch supporter so that a state which holds a person sleeping facing upward is created by the holding arms and crotch supporter. The locking elements constrain the movement of the suspension fitting when the holding arms and crotch supporter are in a closed state. For example, if the main body base is a main body plate, when the main body plate is brought to a point over the chest of the person who is lying on their back, the holding arms and crotch supporter are opened, and the suspension fitting is stood up in the vertical direction from the horizontal main body plate. After the main body plate contacts the person's chest, the suspension fitting is pushed over in the direction of the person's head so that the suspension fitting is substantially parallel to the main body plate; furthermore, the holding arms and crotch supporter are closed so that the person is held from below, and the suspension fitting is constrained. Thus, by lifting the suspension fitting with the person held in the body-holding device, the lying person is raised as the main body plate stands up.

It is desirable that the elements which contact the person's body, such as the main body base which contacts the person's chest, be covered by a soft shock-absorbing material. For example, it is advisable that the respective holding arms and crotch supporter be covered by a soft shock-absorbing material. In this case, the transmission mechanism is installed on the main body base. Accordingly, it is even more desirable to cover the transmission mechanism with a cover. In addition to the transmission mechanism, it is advisable that the pivoting shafts of the respective holding arms and crotch supporter and the supporting brackets of these pivoting shafts, etc. be also covered by covers.

The transmission mechanism may be comprised of a combination of a belt gear sprocket and belt equipped with a timing gear and a combination of a chain sprocket and chain (as described below). Besides such transmissions, universally known motive force transmission mechanisms such as a crank transmission which is a crank and rod combination, a cam transmission, a link transmission, etc. can be also used singly or in combination. For example, the side- and shoulder-holding arms may be installed separately on the left and right in positions corresponding to the sides and shoulders of the person. In this case, existing transmission mechanisms may be separately combined in positions corresponding to the sides or shoulders on the left and right, so that respective transmission mechanisms are constituted, with both transmission mechanisms being linked by a chain or gears, etc. Furthermore, when a main shaft on which a pair of forward and reverse pivoting tubes are provided via a differential gear mechanism is used, a chain, gears or the like may be mounted on this main shaft, so that a single integrated transmission mechanism which links the movements of the suspension fitting, respective holding arms and crotch supporter is constituted.

The body-holding device of the present invention can be used in place of seat belts in automobiles, etc. One example of the body-holding device used in place of seat belts in automobiles, etc. comprises: a main body base fitted on the person's back and fastened to the seat of, for instance, an automobile; a pair of side-holding arms which hold both sides of the person; shoulder-holding arms which hold both shoulders of the person; a crotch supporter which supports the person's crotch; opening-and-closing operating rods for the respective holding arms and a crotch supporter; a transmission mechanism which links the movements of the opening-and-closing operating rods, respective holding arms and the crotch supporter; and locking elements which constrain and release the respective holding arms and crotch supporter. Another example of a body-holding device used in place of seat belts in automobiles, etc. comprises the above-described holding arms, crotch supporter, transmission mechanism and locking elements which are installed on a main body base that is attached in front of the seat of an automobile, etc. via a shock-absorbing mechanism.

Likewise, a body-holding device, in which respective holding arms, a crotch supporter, a transmission mechanism and locking elements are installed on a main body base which can be attached to or detached from a height-adjustable stand, can be used as a working aid for disabled persons. In this case, standing work can be accomplished by if the stand is heightened, and seated work can be accomplished by lowering the stand. Furthermore, when the detachability of the respective holding arms and crotch supporter is taken into account, the body-holding device of the present invention can be used as a life-saving aid. The above-described uses may be utilized not only by disabled persons but also by able-bodied persons.

BRIEF DESCRIPTION OF THE DRAWINGS

FIG. 7 is a side view of an example in which the body-holding device of the present invention is used as a working aid for disabled persons.

DETAILED DESCRIPTION OF THE INVENTION

Figure 1:
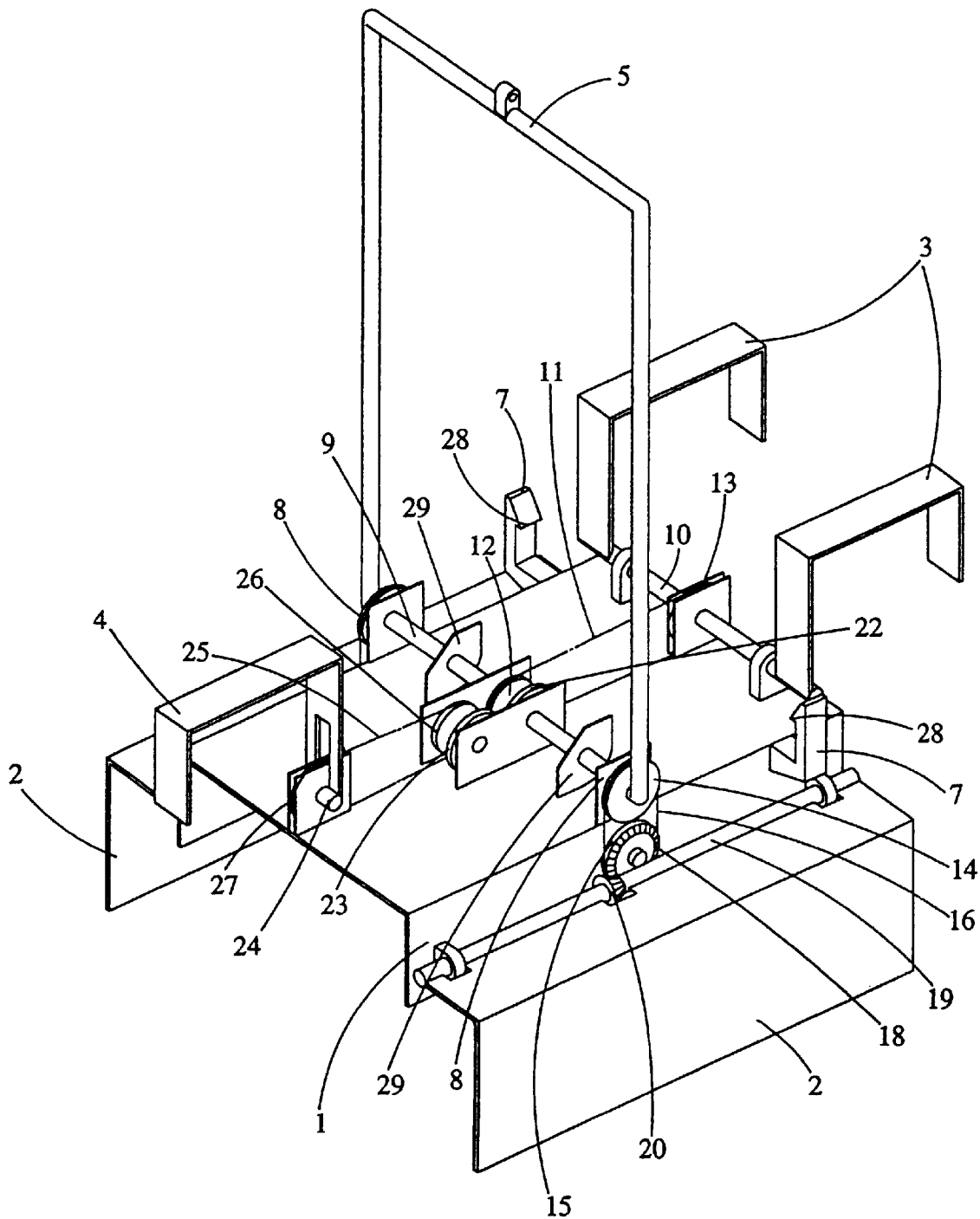
FIG. 1 illustrates an example of a body-holding device that uses a main body plate, showing a state in which the respective holding arms and crotch supporter are open in order to allow a person to be accommodated.

Embodiments of the body-holding device of the present invention will be concretely described with reference to the attached drawings. As is clear from FIG. 1 and FIG. 2, the body-holding device of the present example has an external appearance in which side-holding arms 2, shoulder-holding arms 3, a crotch supporter 4, a suspension fitting 5, a transmission mechanism which links the suspension fitting 5 with the respective holding arms 2 and 3 and crotch supporter 4, and locking elements 7, are installed on a main body plate 1 which contacts a person's chest and has a vertical length corresponding roughly to the seated height of the person's shoulders and a horizontal length corresponding roughly to the width of the person's chest. The respective holding arms 2 and 3 and crotch supporter 4 in the present example are formed by bending plate materials.

Though not shown in the Figures, a soft shock-absorbing material is bonded to the underside of the main body plate 1, i.e., on the side that contacts the person's body. Furthermore, as shown in FIG. 1, a transmission mechanism consisting of a combination of numerous belt gear sprockets and belts equipped with timing gears, is constructed on the upper surface of the main body plate 1. The gate-form suspension fitting 5 is attached to brackets 8 which are respectively installed on the left and right sides of the main body plate 1 so that the suspension fitting can pivot relative to the main body plate 1 from a vertical position to a horizontal position.

Figure 2:
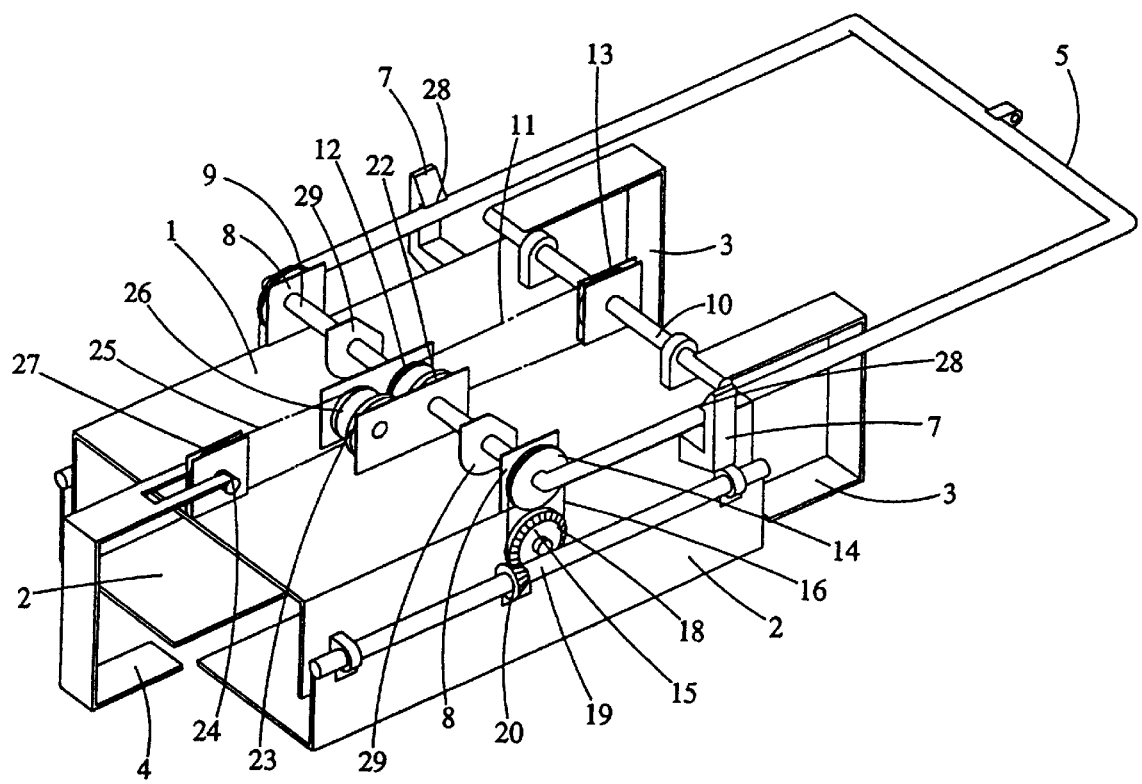
FIG. 2 is a perspective view of a state in which the respective holding arms and crotch supporter are closed so that a person is held in the body-holding device.

The suspension fitting 5 transmits its motive force from the suspension fitting pivoting shaft 9, which is the center of a pivot motion of the suspension fitting 5, to the respective holding arms 2 and 3 and crotch supporter 4. In particular, when the suspension fitting pivoting shaft 9 is pivoted, its motive (pivoting) force is transmitted to the shoulder-holding arm pivoting shaft 10 by a transmission mechanism that is comprised of a belt 11, equipped with a timing gear, and belt gear sprockets 12 and 13; as a result, the shoulder-holding arms 3 are opened and closed. As shown in FIG. 1 and FIG. 2, the suspension fitting pivoting shaft 9 is provided with plate-form stoppers 29 which are used as components that regulate the pivoting range of the suspension fitting 5. Thus, since the pivoting motion of the suspension fitting 5 is regulated by the plate-form stoppers 29, the pivoting range of the shoulder-holding arms 3 is also indirectly regulated.

For the side-holding arms 2, a transmission mechanism is provided in which belt gear sprockets 15 and belt gear sprockets 14, which are attached at both ends of the suspension fitting pivoting shaft 9, are linked by belts 16 that are equipped with timing gears; and when bevel gears 18 that are coaxial with the belt gear sprockets 15 are rotated, bevel gears 20 provided on the side-holding arm pivoting shafts 19 is rotated.

For the crotch supporter 4, a transmission mechanism is provided in which a motive force is transmitted by reverse rotation from a reverse rotation gear 22 installed on the suspension fitting pivoting shaft 9 to a reverse rotation gear 23; and the reverse-rotation motive force is further transmitted by a belt 25 equipped with a timing gear from a belt gear sprocket 26 that is coaxial with the reverse rotation gear 23 to a belt gear sprocket 27 that is coaxial with the crotch supporter pivoting shaft 24.

As a result of the employment of the above-described transmission mechanisms, when the suspension fitting 5 is pivoted from the vertical direction in FIG. 1 to the horizontal direction in FIG. 2, the shoulder-holding arms 3, side-holding arms 2 and crotch supporter 4 are changed at the same time from the open state shown in FIG. 1 to the closed state shown in FIG. 2 by a simple process.

In the body-holding device of the present invention, the respective holding arms 2 and 3 and crotch supporter 4 are closed as shown in FIG. 2; and a person is raised up by lifting the suspension fitting 5 while a state in which the person is supported is maintained. Accordingly, the locking elements 7 which provide a constraint so that the suspension fitting 5 does not move when a person is raised are required. As seen from FIG. 1 and FIG. 2, these locking elements 7 are installed on both sides of the main body plate 1 and have hook-form engaging members 28 which engage with the suspension fitting 5 when the suspension fitting 5 is oriented in a horizontal direction. When the suspension fitting 5 is lifted after it is brought into a position engaged with the hook-form engaging members 28 of the locking elements 7 and is oriented in a horizontal direction, the main body plate 1 is raised together with the suspension fitting 5 while holding the person thereon, resulting in the position shown in FIG. 3. Thus, the person can be moved in a stable fashion by moving the body-holding device with the suspension fitting 5 held "as is."

The respective arms 2 and 3 and crotch supporter 4 are tentatively secured in place when the locking elements 7 constrains the suspension fitting 5; however, in order to provide even greater safety, mechanisms which constrain the respective holding arms 2 and 3 and crotch supporter 4 in a closed state may be separately added.

In the embodiment described above, the respective holding arms and crotch supporter are opened and closed by pivoting mechanisms of the pivoting shafts. However, slide mechanisms might also be used for all or part of these opening and closing actions. The transmission mechanisms used in such a case may be selected from various types of existing motive force transmission mechanisms.

Figure 3:
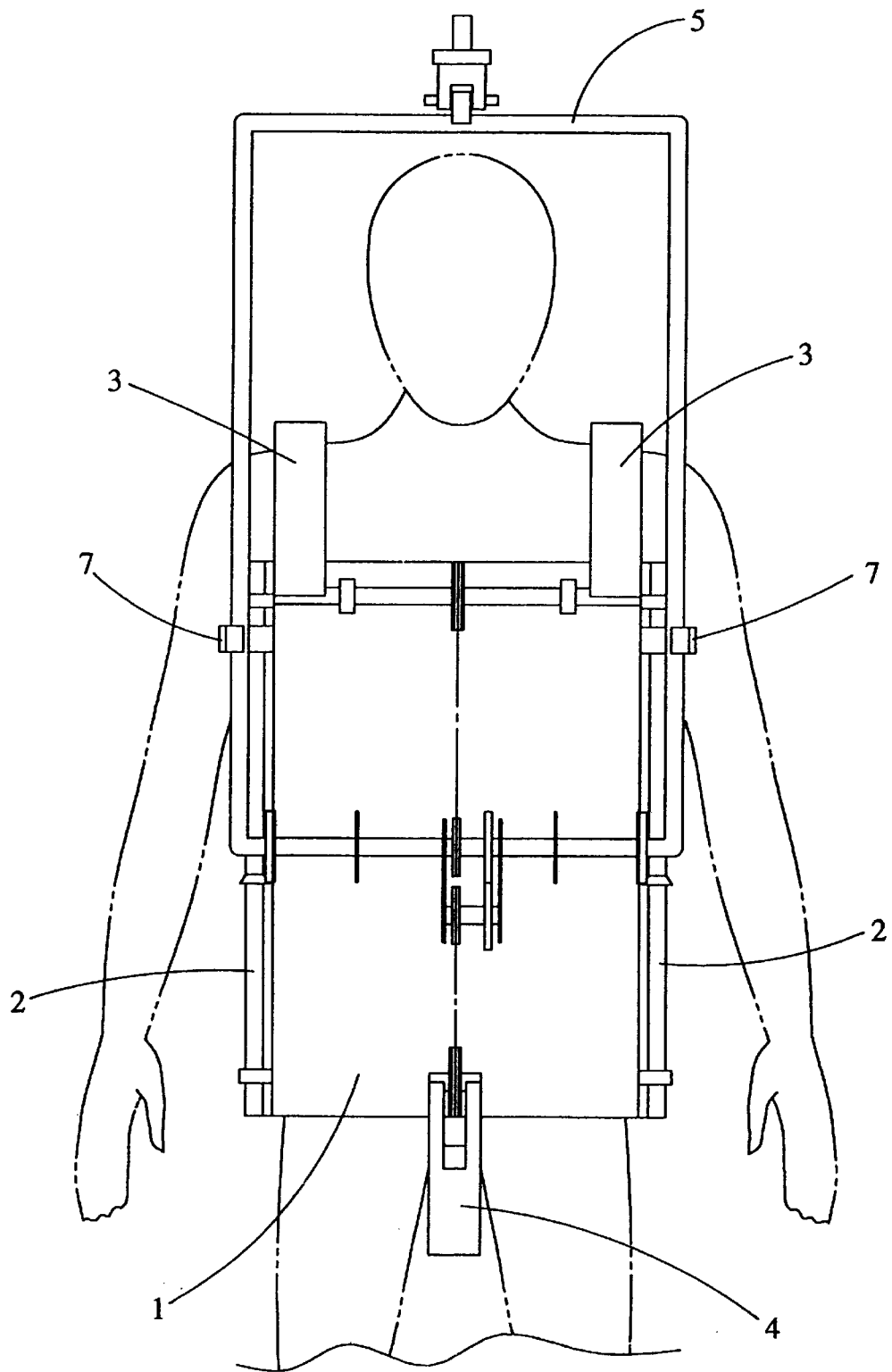
FIG. 3 is a front view of a state in which a person is held and suspended by the body-holding device.
Figure 4:
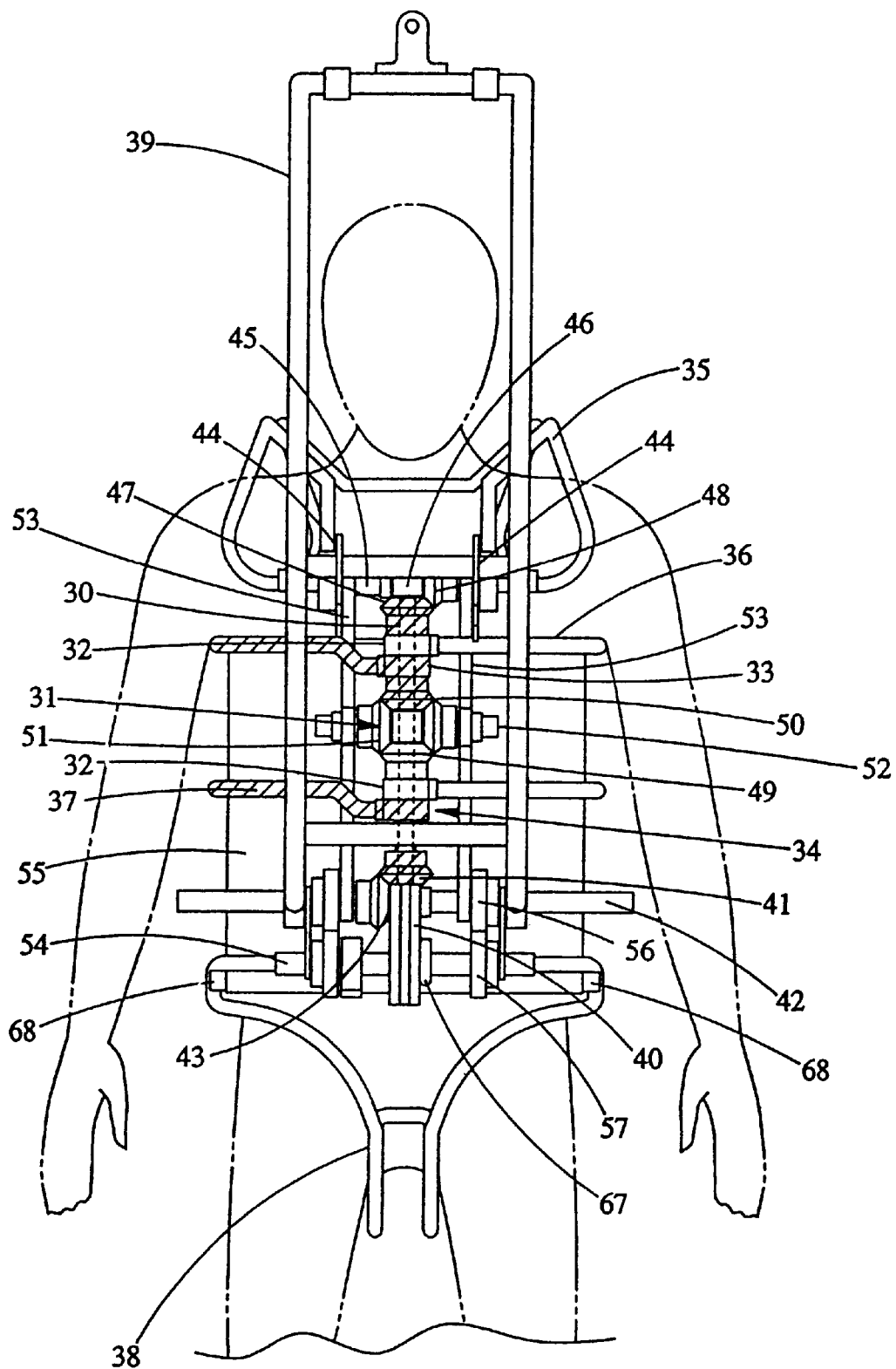
FIG. 4 is a front view (corresponding to FIG. 3) of a state in which a person is held and suspended in a body-holding device that uses a main shaft on which a pair of forward and reverse pivoting tubes are mounted via a differential gear mechanism.
Figure 5:
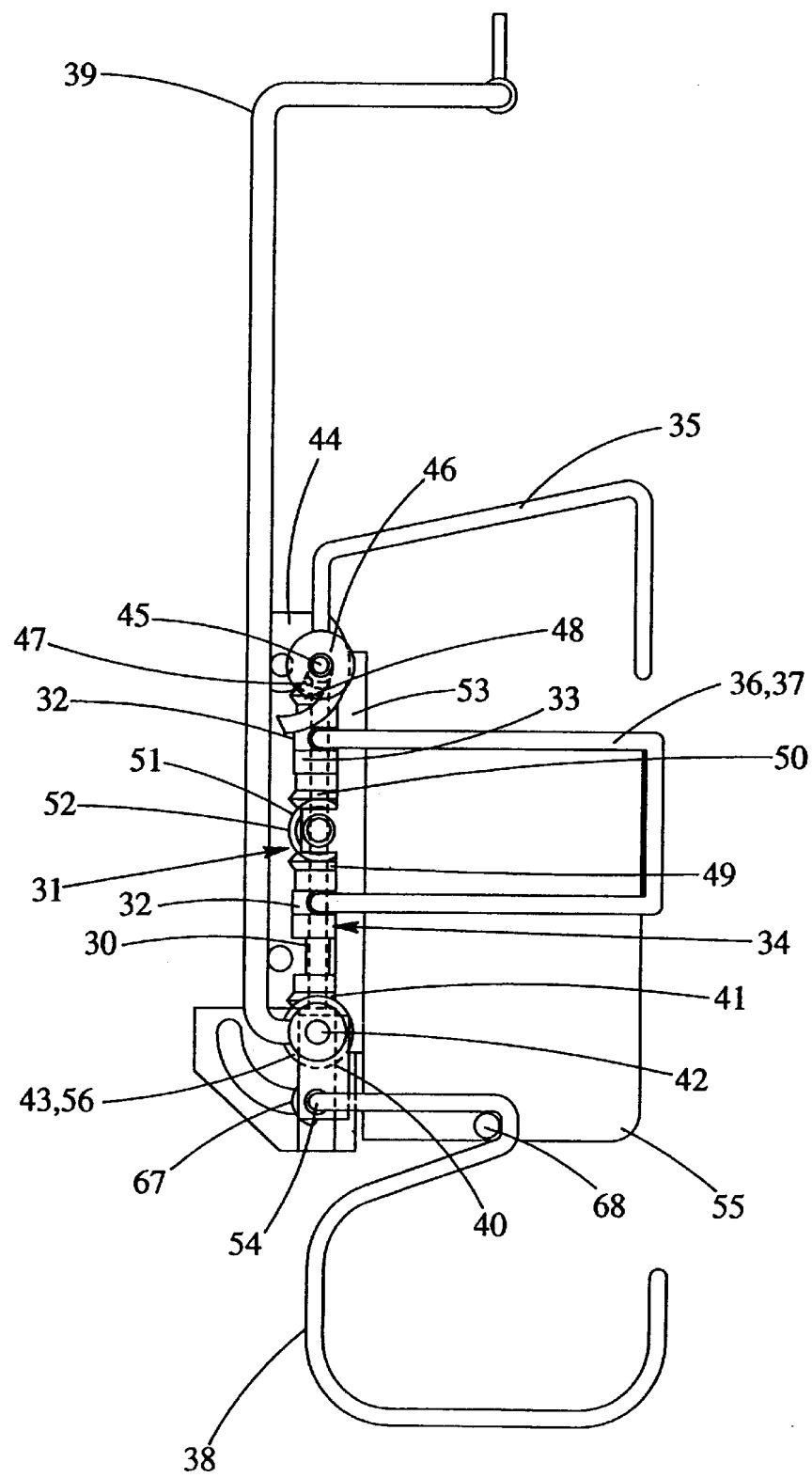
FIG. 5 is a side view of the body-holding device shown in FIG. 4.

In regard to the structure of the transmission mechanism, besides a mechanism in which the transmission mechanisms of the side-holding arms 2 are linked via the suspension fitting pivoting shaft 9 as seen in the example shown in FIG. 1 to FIG. 3, it is also possible to use a mechanism which utilizes, as shown in FIGS. 3 and 4, a main shaft 34 on which a pair of forward and reverse pivoting tubes 33 and 32 (the areas corresponding to the forward pivoting tube 33 are indicated by hatching in FIG. 4) are mounted via a differential gear mechanism 31 at the axial center 30 which has an upper bearing 46 and lower bearing 40 attached to the upper and lower ends. With this structure, a transmission mechanism for the respective holding arms 35, 36 and 37 and crotch supporter 38 is integrally constructed. Among the holding arms 35, 36 and 37 and crotch supporter 38, only one side-holding arm 36 is attached to the reverse pivoting tube 32, and the remaining holding arms 35 and 37 and crotch supporter 38 are linked to the remaining forward pivoting tube 33. Since the side-holding arms 36 and 37 pivot in mutually opposite directions, the pivoting direction is reversed via the differential gear mechanism.

The suspension fitting 39 is shaft-supported on the lower bearing 40 of the axial center 30 facing from the lower end of the main shaft 34 and is linked with the forward pivoting tube 33 via a transmission mechanism in which a bevel gear 41 attached to the forward pivoting tube 33 engages with a bevel gear 43 attached to the suspension fitting pivoting shaft 42. The suspension fitting 39 in this example has shaft-mounted locking elements 44. With the main shaft 34 being oriented horizontally, the locking elements 44 are pivoted so as to be engaged with a shoulder-holding arm pivoting shaft 45; as a result, the suspension fitting 39 is constrained.

Here, the shoulder-holding arm 35 is a U-shaped pipe formed so as to be around the neck from both shoulders of a person. This arm 35 is shaft-supported on the upper bearing 46 of the axial center 30 facing from the upper end of the main shaft 34 and is connected to the forward pivoting tube 33 via a transmission mechanism in which a bevel gear 47 attached to the forward pivoting tube 33 engages with a bevel gear 48 attached to the shoulder-holding arm pivoting shaft 45.

The side-holding arms 36 and 37 are also integrally formed components obtained from pipes. The left side-holding arm 37 in FIG. 4 is attached to the forward pivoting shaft 33, while the right side-holding arm 36 is attached to the reverse pivoting tube 32. As described above, the forward and reverse pivoting tubes 33 and 32 pivot in opposite directions via the differential gear mechanism 31; accordingly, the side-holding arms 36 and 37 pivot in opposite directions. Thus, in the present example, the main shaft 34 including the differential gear mechanism 31 also acts as a transmission mechanism for the side-holding arms 36 and 37. The differential gear mechanism 31 has a structure in which a bevel gear 50 attached to the forward pivoting tube 33 and a bevel gear 49 attached to the reverse pivoting tube 32 are connected by an intermediate gear 51.

In the present example, supporting frames 53 are lined up parallel with the main shaft 34 so as to support the intermediate gear shaft 52 of the differential gear mechanism 31. The supporting frames 53 support the shoulder-holding arm pivoting shaft 45 and suspension fitting pivoting shaft 42, thus preventing the differential gear mechanism 31 from pivoting. In the present example, a jacket frame 55 which fits the human body is attached to this supporting frame 53. In terms of external appearance, this jacket frame 55 is similar to the above-described main body plate 1 (see FIG. 1); however, the jacket frame 55 in this example is specially caused to fit the human body as a guide for the mounting of the device. Here, the main shaft 34 is what integrates the suspension fitting 39, respective holding arms 35, 36 and 37, crotch supporter 38 and respective transmission mechanisms, etc.

The crotch supporter 38 is also an integrally-molded element formed from a pipe similar to the other movable elements and is caused to pivot opposite the suspension fitting 39 by a transmission mechanism in which a reverse rotation gear 56 attached to the suspension fitting pivoting shaft 42 engages with a reverse rotation gear 57 attached to the crotch supporter pivoting shaft 54. The locking elements 44 simultaneously constrain and release the suspension fitting 39, shoulder-holding arm 35 and side-holding arms 36 and 37 together with the crotch supporter 38. In addition, in this example, an independent hook 67 is installed especially for the crotch supporter 38, so that the crotch supporter 38 alone can be separately opened in the above-described constrained state effected by the locking elements 44. Furthermore, in order to reinforce the support by the crotch supporter 38 when the body is suspended, engaging projections 68 which engage with and support the crotch supporter 38 are caused to protrude from the jacket frame 55.

As a result of the above described structure, the shoulder-holding arm 35, side-holding arms 36 and 37 and crotch supporter 38 are opened when the suspension fitting 39 is raised and then closed when the suspension fitting 39 is pushed over (i.e., oriented parallel to the main shaft 34). When the locking elements 44 provided on the suspension fitting 39 are engaged with the shoulder-holding arm pivoting shaft 45 in a state in which the respective holding arms 35, 36 and 37 and crotch supporter 38 are closed, the suspension fitting 39, holding arms 35, 36 and 37 and crotch supporter 38 can be constrained, so that the person held by the body-holding device can be safely suspended and moved.

The characterizing feature of the body-holding device of the present example is the differential gear mechanism 31. As a result of this differential gear mechanism 31, the transmission mechanisms for the respective holding arms 35, 36 and 37 and crotch supporter 38 can be concentrated in a single main shaft 34, so that the transmission mechanism can be made more compact than in the example described above (in FIG. 1–FIG. 3). This offers the advantage of allowing the body-holding device to be made smaller.

As a result of the structure described above, the body-holding device of the present invention allows the safe and easy movement of bedridden elderly and persons suffering from illness. Furthermore, the device of the present invention makes it possible to hold and release persons without any particular need for a driving source, so that the device of the present invention is low-cost. Furthermore, the present invention has a broad range of applications; e.g., the body-holding device of the present invention can be used as a body-protecting device which offers a high degree of safety than conventional seat belts, etc.

Figure 6:
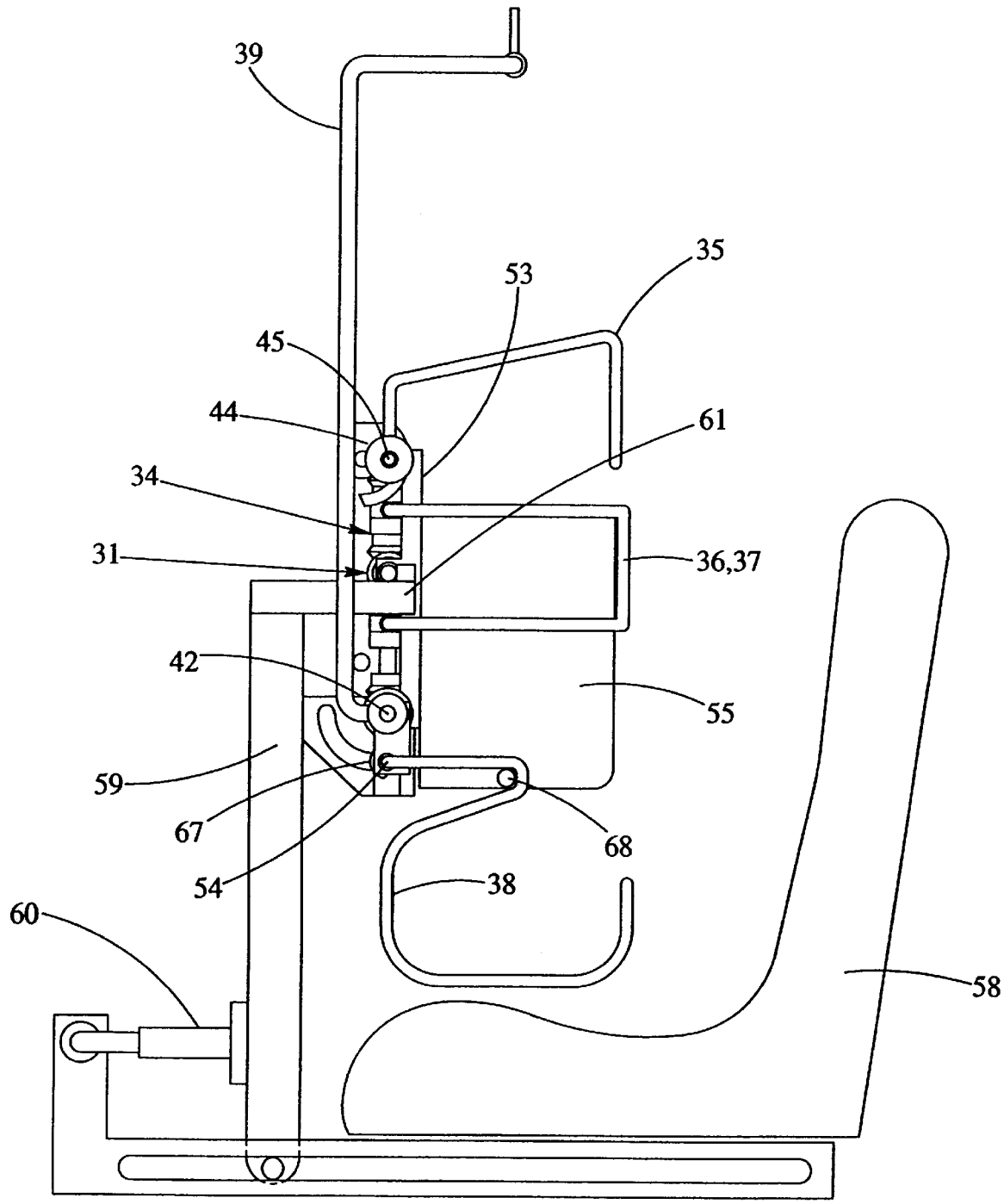
FIG. 6 is a side view of an example in which the body-holding device of the present invention is used as a shock-absorbing device for an automobile, etc.

The shock-absorbing device for automobiles, etc., shown in FIG. 6 and the working aid for disabled persons shown in FIG. 7 may be cited as concrete examples of application.

The above-described shock-absorbing device is designed so that the body-holding device is detachably attached to a shock-absorbing mechanism 60 attached to a reference arm 59 that is positionally adjustable forward and rearward with respect to an automobile seat 58. The body-holding device is attached by engaging an intermediate gear shaft 52 protruding to the left and right from the differential gear mechanism 31 with a hanger 61 on the reference arm 59. This shock-absorbing device fastens a person's body to the seat 58 in the manner of a seat belt; and in addition, the shock of collisions, etc., is attenuated by the shock-absorbing mechanism 60 before being transmitted to the person. Furthermore, the body-holding device itself acts as a suit of armor to protect the person's body from impacts and flying objects from the outside; accordingly, the safety of the user can be greatly improved.

The above-described working aid for disabled persons is designed so that the body-holding device is detachably mounted on a height adjustable stand 62. The body-holding device is attached by engaging an intermediate gear shaft 52 protruding to the left and right from the differential gear mechanism 31 with a hanger 61 of an upper stand member 63. The stand 62 consists of a lower stand member 65 which is installed upright on a base 64, and the upper stand member 63 which is slidably inserted in this lower stand member 65. The overall height of the stand 62 is adjusted according to the amount by which the upper stand member 63 is inside the lower stand member 65. Following adjustment, the upper stand member 63 is fastened to the lower stand member 65 by means of a pin 66. If the body-holding device is attached with the overall height of the stand 62 set at a high value, the body-holding device can be used for standing work; on the other hand, if the body-holding device is attached with the overall height of the stand 62 set at a low value, the body-holding device can be used for seated work.

I claim:

1. A body-holding device in which a pair of side-holding arms which hold both sides of a person, a pair of shoulder-holding arms which hold both shoulders of said person, a crotch supporter which supports said person's crotch, opening-and-closing operating rods for said respective holding arms and crotch supporter, a transmission mechanism which links a movement of said opening-and-closing operating rods, respective holding arms and crotch supporter, and locking elements which constrain and release said respective holding arms and crotch supporter, are installed on a main body base which is fastened to a seat of an automobile.

2. A body-holding device in which a pair of side-holding arms which hold both sides of a person, a pair of shoulder-holding arms that hold both shoulders of said person, a crotch supporter which supports said person's crotch, opening-and-closing operating rods for respective holding arms and crotch supporter, a transmission mechanism which links a movement of said opening-and-closing operating rods, respective holding arms and crotch supporter, and locking elements which constrain and release said respective holding arms and crotch supporter, are installed on a main body base attached via a shock-absorbing mechanism in front of a seat of an automobile.

* * * * *

UNITED STATES PATENT AND TRADEMARK OFFICE
CERTIFICATE OF CORRECTION

PATENT NO. : 6,152,535
DATED : November 28, 2000
INVENTOR(S) : Teruhisa Onishi

It is certified that error appears in the above-indentified patent and that said Letters Patent is hereby corrected as shown below:

Item [54] Title of Invention:

Change "AUTOMOBILE SEAT WITH DEVICE FOR HOLDING A HUMAN BODY" to --DEVICE FOR HOLDING A HUMAN BODY--

Signed and Sealed this

First Day of May, 2001

Attest:

NICHOLAS P. GODICI

Attesting Officer

Acting Director of the United States Patent and Trademark Office